(12) United States Patent
Kaplan et al.

(10) Patent No.: US 8,254,567 B2
(45) Date of Patent: Aug. 28, 2012

(54) TELECOMMUNICATIONS MOUNTING CASE

(75) Inventors: Steven E. Kaplan, Elyria, OH (US); Frank C. Wimler, III, Elizabeth, CO (US)

(73) Assignee: Mulitlink, Inc., Elyria, OH (US)

( * ) Notice: Subject to any disclaimer, the term of this patent is extended or adjusted under 35 U.S.C. 154(b) by 214 days.

(21) Appl. No.: 12/849,383

(22) Filed: Aug. 3, 2010

(65) Prior Publication Data

US 2012/0033802 A1 Feb. 9, 2012

(51) Int. Cl.
*H04M 1/00* (2006.01)
(52) U.S. Cl. .................................. 379/454; 379/441
(58) Field of Classification Search ............ 379/413.04, 379/441, 450, 454; 248/558, 645, 674, 220.21, 248/222.41; 361/644, 657, 679.37
See application file for complete search history.

(56) References Cited

U.S. PATENT DOCUMENTS

| 5,378,174 A | 1/1995 | Brownlie et al. |
| 7,918,430 B2 | 4/2011 | Romerein et al. |

*Primary Examiner* — Tuan Nguyen
(74) *Attorney, Agent, or Firm* — Renner, Otto, Boisselle & Sklar, LLP

(57) ABSTRACT

Telecommunications mounting case includes an enclosure containing a mounting plate having a grid pattern of crisscrossing horizontal and vertical slots or grooves extending partway through the mounting plate. The crisscrossing slots or grooves have a substantially uniform spacing therebetween in increments of the spacing between screw mounts on respective vertical and horizontal telecommunications devices mountable within the case. Each of the slots or grooves has substantially uniformly spaced apart side walls with a spacing therebetween that is somewhat less than the thread diameters of a range of different sized mounting screws used to attach the telecommunications devices to the mounting plate to enable the mounting screws to bite into the side walls when started by hand.

19 Claims, 4 Drawing Sheets

TELECOMMUNICATIONS MOUNTING CASE

FIELD OF THE INVENTION

This invention relates generally to a telecommunications mounting case that makes it easier for technicians to mount passive and/or active telecommunications devices either horizontally or vertically within the case for servicing residential and commercial customers.

BACKGROUND OF THE INVENTION

Telecommunications mounting cases are commonly used to provide environmental protection for externally located telecommunications devices for servicing residential and commercial customers. However, there is an ongoing need to make it easier to mount not only telecommunications devices that meet the SCTE (Society of Cable Telecommunications Engineers) specifications for passive telecommunications devices that fit within the case, but also to mount other active and passive telecommunications devices that may not meet these specifications. Also there is a need for a telecommunications mounting case that allows for hand mounting of these telecommunications devices on location by technicians using different sized mounting screws as well as enabling the technicians to easily start the mounting screws by hand. Moreover, there is a need to be able to easily mount both vertical and horizontal telecommunications devices within the case.

SUMMARY OF THE INVENTION

The present invention addresses these and other needs by providing a telecommunications mounting case that enables virtually any size telecommunications device that fits within the case to be easily mounted either horizontally or vertically within the case, including those devices meeting the SCTE specifications as well as those that do not.

In accordance with one aspect of the invention, the telecommunications mounting case includes an enclosure containing a mounting plate having a grid pattern of crisscrossing horizontal and vertical slots or grooves that enables virtually any size telecommunications device that fits within the case to be mounted either horizontally or vertically within the case.

In accordance with another aspect of the invention, the crisscrossing horizontal and vertical slots or grooves in the mounting plate have a substantially uniform spacing therebetween in increments of the spacing between screw mounts on respective vertical and horizontal telecommunication devices that are mountable within the case.

In accordance with another aspect of the invention, each grid of the grid pattern formed by the crisscrossing horizontal and vertical slots or grooves is substantially of the same size.

In accordance with another aspect of the invention, each of the slots or grooves has substantially uniformly spaced apart side walls with a spacing therebetween that is somewhat less than the thread diameters of a range of different sized mounting screws used to attach the telecommunications devices to the mounting plate to enable the mounting screws to bite into the side walls when started by hand.

In accordance with another aspect of the invention, there is sufficient clearance space between the mounting plate and the back wall of the enclosure to accommodate the length of the mounting screws extending through the mounting plate when the mounting screws are fully tightened to secure the telecommunications devices to the mounting plate.

These and other objects, advantages, features and aspects of the present invention will become apparent as the following description proceeds.

To the accomplishment of the foregoing and related ends, the invention, then, comprises the features hereinafter more fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
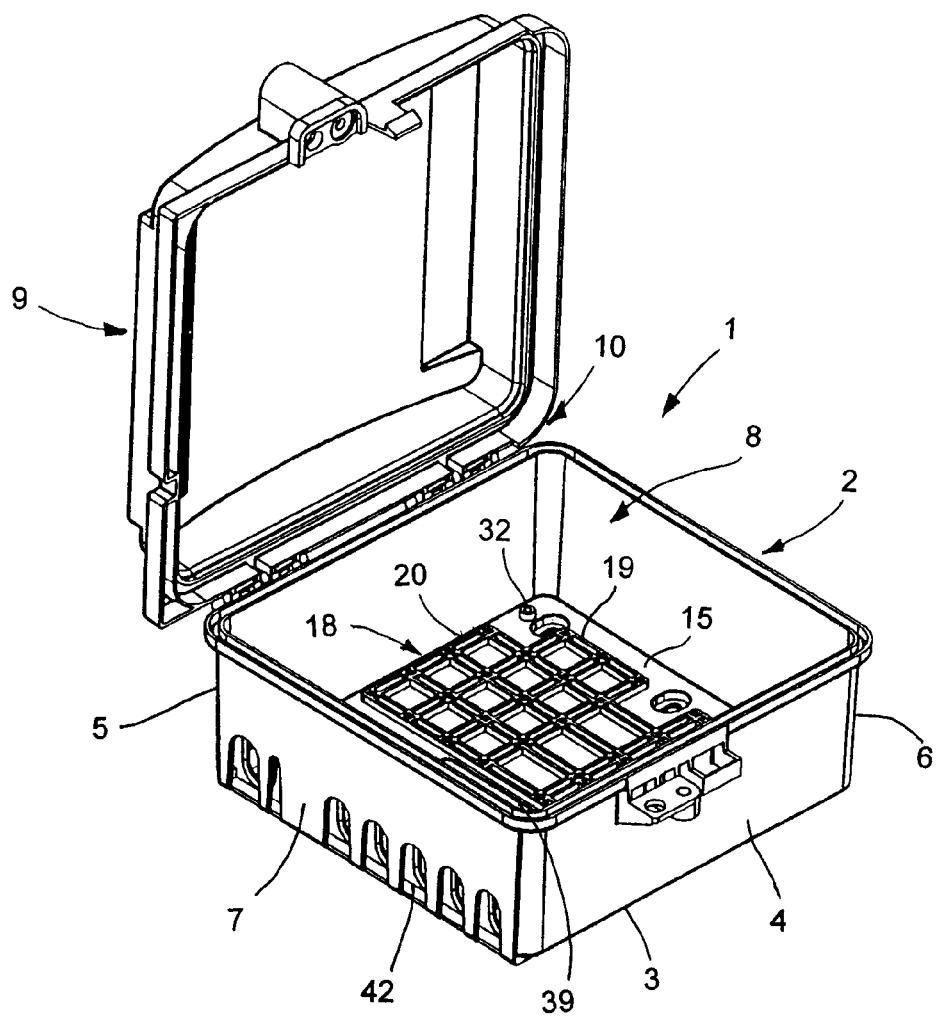
FIG. 1 is a schematic perspective view of one form of telecommunications mounting case of the present invention with the cover shown in the open position.
Figure 2:
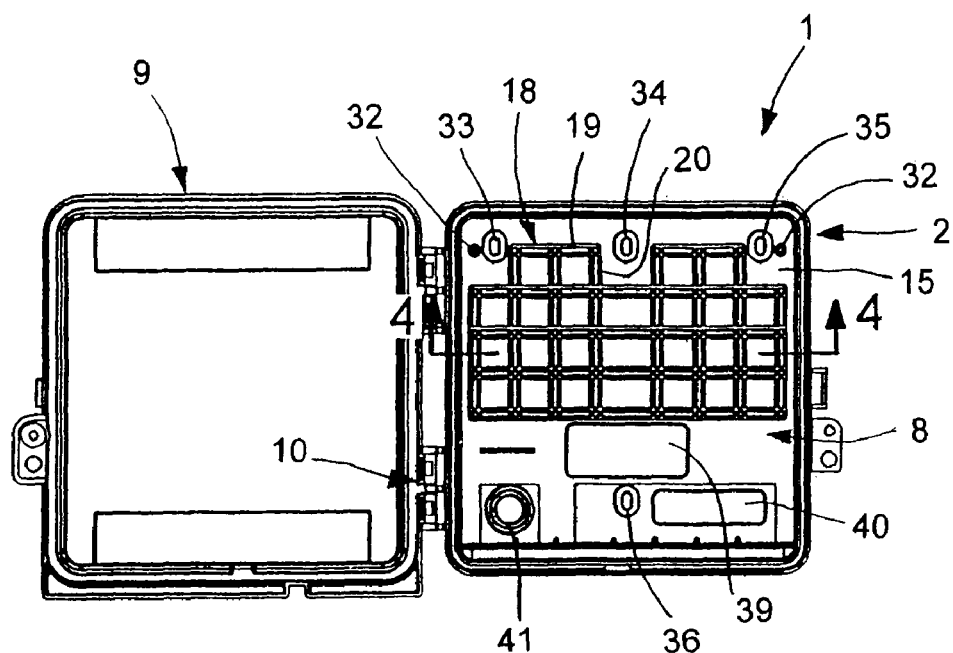
FIG. 2 is a front plan view of the case of FIG. 1 showing the cover rotated 180° relative to the front of the case.
Figure 3:
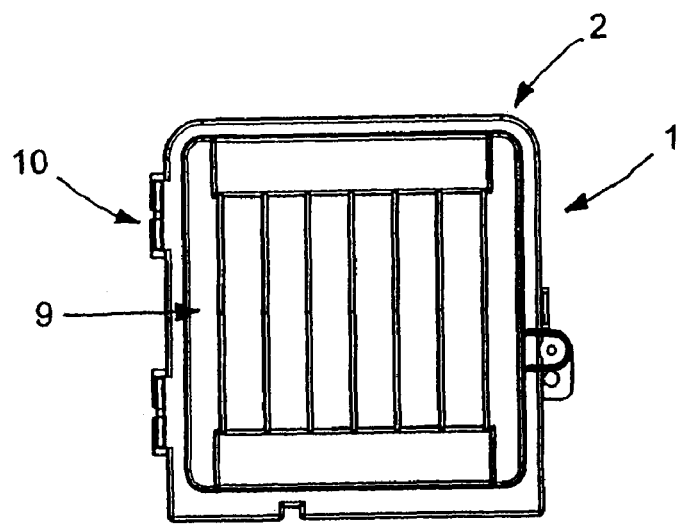
FIG. 3 is a front plan view of the case similar to FIG. 2 but showing the cover in the fully closed position.

Referring now more particularly to the drawings, and initially to FIGS. 1-3, there is shown one form of telecommunications mounting case 1 of the present invention for providing environmental protection for various telecommunication devices such as splitters, amplifiers, network interface and cross connect devices and the like when mounted on an exterior vertical support structure of a building or other vertical support. The case includes an enclosure 2 having a back wall 3, side walls 4, 5, top and bottom walls 6 and 7 and an open front 8. A cover 9 may be attached to the enclosure 2 in any convenient manner, for example, by providing a hinge connection 10 along one of the side walls for selective movement of the cover between the closed position shown in FIG. 3 and open position shown in FIGS. 1 and 2 for accessing the enclosure through the open front.

Figure 4:
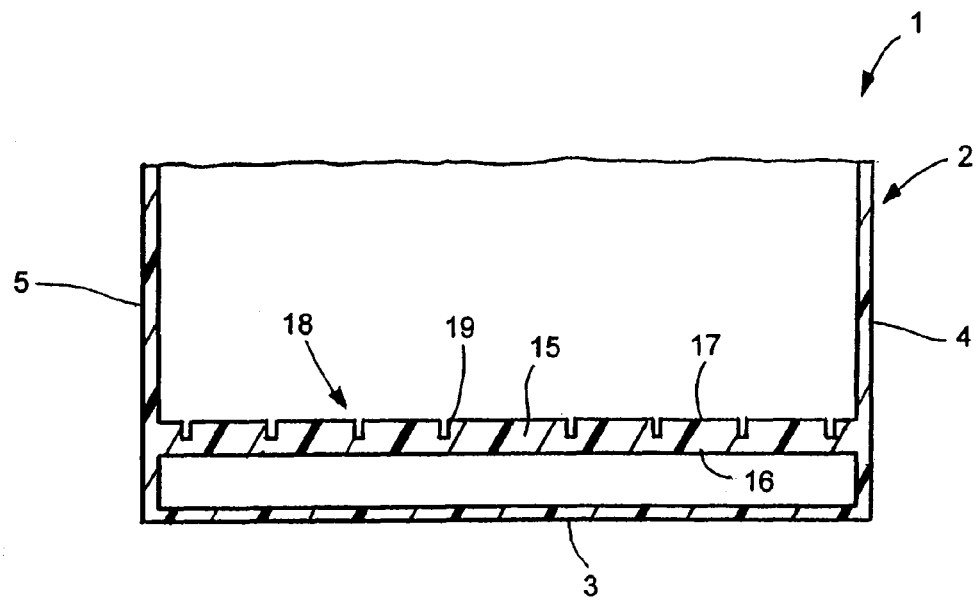
FIG. 4 is an enlarged fragmentary transverse section through the case of FIG. 2, taken on the plane of the line 4-4 thereof.
Figure 5:
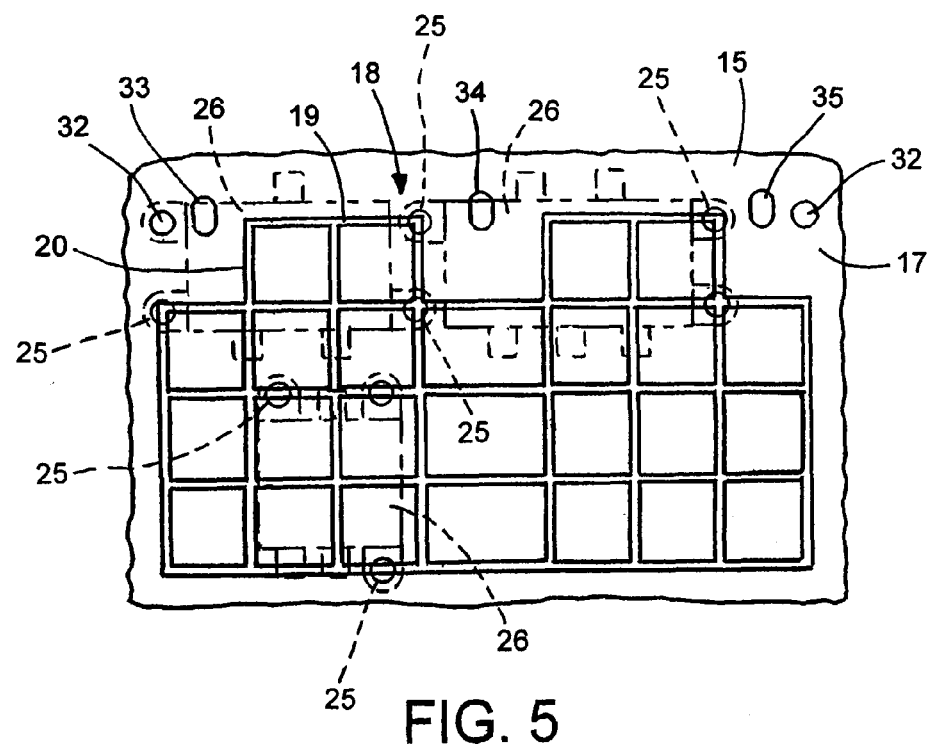
FIG. 5 is an enlarged fragmentary front plan view of a portion of a mounting plate within the case of FIG. 2, schematically showing both horizontal and vertical telecommunications devices attached to the mounting plate.
Figure 6:
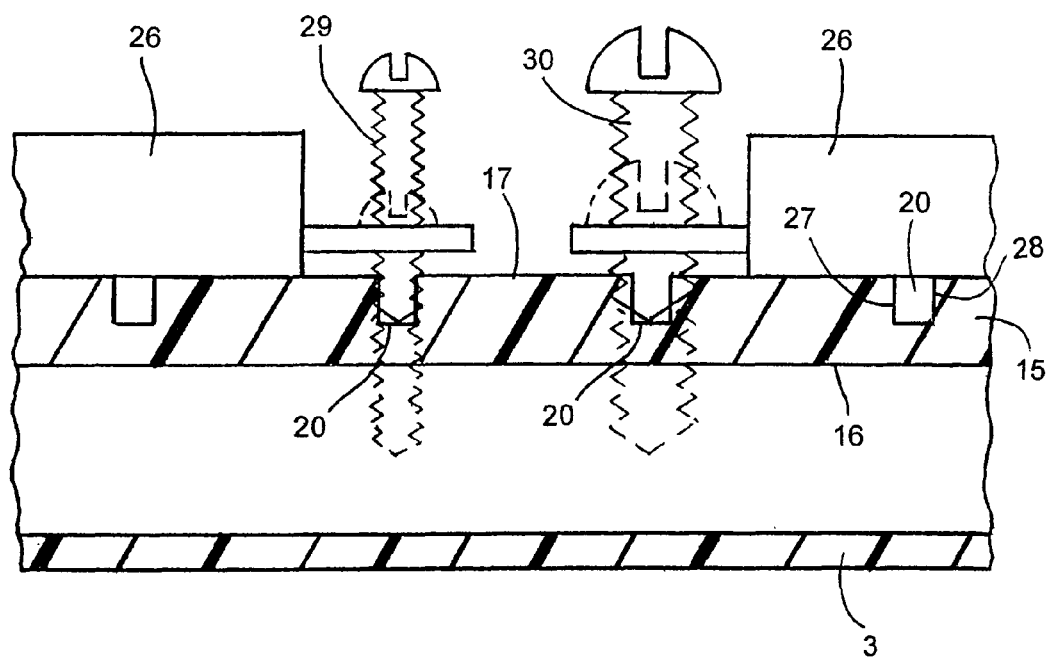
FIG. 6 is a further enlarged section of a portion of the back wall and mounting plate of the case of FIG. 4, schematically showing different sized mounting screws biting into the side walls of respective slots or grooves that form a grid pattern in the mounting plate for ease of attaching the telecommunications devices to the mounting plate.

Within enclosure 2 is a mounting plate 15 which, as shown in FIGS. 4 and 6, has a back side 16 in spaced relation from the back wall 3 and a front side 17. On the front side 17 is a grid pattern 18 formed by a plurality of crisscrossing horizontal and vertical slots or grooves 19 and 20 (see FIGS. 1, 2 and 5). These slots or grooves extend partway through the mounting plate to facilitate mounting, either vertically or horizontally within the case, not only telecommunications devices that meet the SCTE specifications for passive devices, but also other active and passive telecommunications devices that do not meet the specifications. The SCTE sets the specifications for the cable industry, including the location of the mounting holes on the devices in multiples of one inch increments. Other active and passive devices that do not meet these specifications nevertheless also have their mounting holes located in multiples of one inch increments.

To accommodate such screw mount spacing, each grid of the grid pattern formed by the crisscrossing horizontal and vertical slots or grooves 19 and 20 in mounting plate 15 has, for example, a one inch center. This enables virtually any size telecommunications device that fits within the case to be mounted side by side either horizontally or vertically within the case by aligning the mounting holes 25 of each device 26 with respective vertical or horizontal slots or grooves 19 or 20 of the grid pattern 18 as schematically shown in phantom lines in FIG. 5.

There isn't any specified screw size for mounting these telecommunications devices. To accommodate a range of specified mounting screw sizes that would typically be used, each of the slots or grooves 19 and 20 of the grid pattern 18 desirably has substantially uniformly spaced apart side walls 27 and 28 with a spacing therebetween somewhat less than the smallest thread diameter of the selected range of specified mounting screw sizes. Thus when different sized mounting screws 29 and 30 such as those schematically shown in FIG. 6 are started by hand, they will easily bite into the walls of the slots or grooves as shown in solid lines in FIG. 6 to provide a sufficient grip to hold the screws in place so they can then be fully tightened as shown in phantom lines in FIG. 6 without concern about the mounting screws falling out of the slots or grooves before they are tightened.

Of course, the mounting plate 15 should be of sufficient thickness and strength to accommodate the depth of the slots or grooves 19 and 20 formed therein and still leave enough remaining wall thickness to prevent the mounting plate from breaking or cracking when the mounting screws are threaded into the slots or grooves and then fully tightened. Also sufficient clearance space 38 should be provided between the back side 16 of the mounting plate 15 and the back wall 3 of the mounting case 1 to accommodate the length of the mounting screws 29, 30 that extend through the mounting plate when the mounting screws are fully tightened as schematically shown in phantom lines in FIG. 6.

Also, if desired, one or more starter holes 32 may be provided in the front side of mounting plate 15 adjacent the upper left and/or right corners of the grid pattern 18 in line with but vertically and horizontally spaced from respective ones of the vertical and horizontal slots or grooves in the mounting plate for use by a technician as the starter for the attachment of multiple devices (either horizontal or vertical) to the mounting plate within the case as schematically shown in FIG. 5.

A plurality of recessed mounting holes 33-36 may also be provided in the mounting plate 15 in spaced relation from the grid pattern 18 as schematically shown in FIGS. 2 and 5 to permit the back wall 3 of the case 1 to be attached to a vertical support structure of a building or other vertical support (not shown). The top and bottom center holes 34 and 36 may also be used to mount the case to a vertical stake if not convenient to mount the case to an exterior wall of a building structure.

One or more holes or knockouts 39-41 may also be provided in the mounting plate 15 in spaced relation from the grid pattern 18 to provide access to cable or wire access openings 42 in the bottom wall 7 of the case intermediate the back wall 3 and mounting plate 15 (see FIGS. 1 and 2).

Although the invention has been shown and described with respect to a certain embodiment, it is obvious that equivalent alterations and modifications will occur to others skilled in the art upon the reading and understanding of the specification. In particular, with regard to the various functions performed by the above-described components, the terms (including any reference to a "means") used to describe such components are intended to correspond, unless otherwise indicated, to any component which performs the specified function of the described component (e.g., that is functionally equivalent) even though not structurally equivalent to the disclosed component which performs the function of the herein illustrated exemplary embodiment of the invention. In addition, while a particular feature of the invention may have been disclosed with respect to only one embodiment, such feature may be combined with one or more other features as may be desired and advantageous for any given or particular application.

What is claimed is:

1. A telecommunications mounting case comprising an enclosure having a back wall attachable to a vertical support structure of a building or other vertical support, and a mounting plate within the enclosure having a back side in spaced relation from the back wall and a front side facing away from the back wall for mounting one or more telecommunication devices within the case, the front side of the mounting plate having a grid pattern formed by a plurality of horizontal and vertical crisscrossing slots or grooves extending partway through the mounting plate that are engageable by mounting screws used to attach one or more telecommunications devices to the mounting plate.

2. The case of claim 1 wherein the crisscrossing horizontal and vertical slots or grooves in the front side of the mounting plate have a substantially uniform spacing therebetween.

3. The case of claim 2 wherein each grid of the grid pattern formed by the crisscrossing horizontal and vertical slots or grooves is substantially the same size.

4. The case of claim 3 wherein each grid formed by the crisscrossing horizontal and vertical slots or grooves is substantially in the shape of a square.

5. The case of claim 4 wherein each grid has a substantially one inch center.

6. The case of claim 1 wherein each of the slots or grooves has substantially uniformly spaced apart side walls.

7. The case of claim 4 wherein one or more telecommunications devices are attached to the front face of the mounting plate by one or more specified mounting screws biting into the side walls of respective horizontal or vertical slots or grooves in the mounting plate.

8. The case of claim 7 wherein the spacing between the side walls of the respective slots or grooves is somewhat less than the thread diameters of a range of different sized mounting screws used to attach the telecommunications devices to the mounting plate to enable the mounting screws to bite into the side walls when started by hand.

9. The case of claim 8 wherein the mounting plate has an overall thickness that is less than a length of the mounting screws used to attach the telecommunications devices to the mounting plate when the mounting screws are fully tightened.

10. The case of claim 9 wherein there is sufficient clearance space between the back side of the mounting plate and the back wall of the enclosure to accommodate the length of the mounting screws extending through the mounting plate when fully tightened.

11. The case of claim 1 wherein the mounting plate has a plurality of recessed mounting holes in spaced relation from the grid pattern for receiving fasteners for attaching the back wall of the enclosure to a vertical support.

12. The case of claim 1 further comprising at least one starter hole in the front side of the mounting plate adjacent an upper outside corner of the grid pattern in line with but vertically and horizontally spaced from respective ones of the crisscrossing vertical and horizontal slots or grooves in the mounting plate for use as a starter for attaching multiple telecommunications devices to the mounting plate.

13. The case of claim 1 further comprising a plurality of cable or wire access openings in a bottom wall of the enclosure intermediate the back wall and mounting plate, and one or more holes or knockouts in the mounting plate in spaced relation from the grid pattern for providing access to the cable or wire access openings through the mounting plate.

14. A telecommunications mounting case comprising an enclosure having a back wall, side walls, top and bottom walls and an open front, a cover for selectively opening and closing the open front, and a mounting plate within the enclosure having a back side in spaced relation from the back wall and a front side facing toward the open front for mounting one or more telecommunications devices within the case, the front side of the mounting plate having a grid pattern formed by a plurality of substantially uniformly spaced crisscrossing horizontal and vertical slots or grooves extending partway through the mounting plate, each of the slots or grooves having substantially uniformly spaced apart side walls.

15. The case of claim 14 wherein one or more horizontal or vertical telecommunications devices are attached to the front side of the mounting plate by mounting screws biting into the side walls of respective vertical or horizontal grooves in the mounting plate.

16. The case of claim 15 wherein the spacing between the side walls of the respective slots or grooves is somewhat less than the thread diameters of a range of different sized mounting screws used to attach the telecommunications devices to the mounting plate.

17. The case of claim 16 wherein the mounting plate has an overall thickness that is less than a length of the mounting screws used to attach the telecommunications devices to the mounting plate when the mounting screws are fully tightened, and there is sufficient clearance space between the back side of the mounting plate and the back wall of the enclosure to accommodate the length of the mounting screws extending through the mounting plate when fully tightened.

18. The case of claim 14 further comprising at least one starter hole in the front side of the mounting plate adjacent an upper outside corner of the grid pattern in line with but vertically and horizontally spaced from respective ones of the crisscrossing vertical and horizontal slots or grooves in the mounting plate for use as a starter for attaching multiple telecommunications devices to the mounting plate.

19. The case of claim 14 further comprising a plurality of cable or wire access openings in the bottom wall of the enclosure intermediate the back wall and mounting plate, and one or more holes or knockouts in the mounting plate in spaced relation from the grid pattern for providing access to the cable or wire access openings through the mounting plate.

* * * * *